United States Patent [19]

Nunlist

[11] Patent Number: 4,473,171

[45] Date of Patent: Sep. 25, 1984

[54] NOZZLE CONSTRUCTION FOR JACKETED PRESSURE VESSELS

[75] Inventor: Erwin J. Nunlist, Penfield, N.Y.

[73] Assignee: Kennecott Corporation, Cleveland, Ohio

[21] Appl. No.: 254,734

[22] Filed: Apr. 16, 1981

[51] Int. Cl.³ .................. B65D 90/10; B65D 90/04; B65D 90/08

[52] U.S. Cl. .................. 220/465; 220/426; 220/457; 239/600

[58] Field of Search .............. 220/426, 428, 457, 459, 220/465; 239/600, 601

[56] References Cited

U.S. PATENT DOCUMENTS

| | | | |
|---|---|---|---|
| 2,239,509 | 4/1941 | Uecker | 220/465 |
| 2,281,407 | 4/1942 | Bohnsack | 220/459 |
| 2,330,306 | 9/1943 | Murphy | 220/459 |
| 2,885,182 | 10/1958 | Payne | 239/600 |
| 3,129,777 | 4/1964 | Haspert | 239/600 |
| 3,349,951 | 10/1967 | Peterson | 220/465 |
| 3,352,444 | 11/1967 | Anderson | 220/465 |
| 3,425,582 | 2/1969 | Nunlist | 220/426 |
| 3,559,844 | 2/1971 | Schlosberg | 220/465 |

*Primary Examiner*—George E. Lowrance
*Attorney, Agent, or Firm*—R. Lawrence Sahr

[57] ABSTRACT

A nozzle construction for jacketed pressure vessels includes a nozzle member which extends through a vessel opening, the vessel portion adjacent the opening and a portion of the nozzle having complementary surfaces. A split ring and bolt arrangement draws the nozzle against a gasket disposed between the complementary nozzle and vessel surfaces.

11 Claims, 6 Drawing Figures

NOZZLE CONSTRUCTION FOR JACKETED PRESSURE VESSELS

BACKGROUND OF THE INVENTION

The present invention relates generally to jacketed pressure vessels and more particularly to an improved nozzle construction for glass-lined pressure vessels.

Glassed steel vessels are well known in the art and are used in many applications involving the mixing or chemical reacting of corrosive and abrasive materials. Such vessels often are jacketed to provide heating or cooling of the vessel as necessary. Each vessel is provided with a manhole, one or more top located nozzles and at least one bottom nozzle. The upper nozzles provide for the entry of various apparatus such as agitator shafts, baffles or probes into the vessel. Some of the upper nozzles allow the introduction of product into the vessel and the bottom nozzle is an outlet nozzle.

Conventional nozzles consist of a protruding opening in the head of the vessel made by a swaging operation. This provides the smooth curve to the vessel opening which is required for glass lining. A ring is then welded to the swaged protrusion to add height and a nozzle flange welded to the ring.

The bottom outlet nozzle presents a particular design problem, especially in the case of jacketed vessels. In jacketed vessels, two constructions are common in order to expose as much of the bottom head of the vessel as possible to the heating or cooling fluid in the jacket.

In one construction, a collar is welded to the bottom head of the vessel about the nozzle. The jacket is then welded to this collar. With this arrangement, the portion of the bottom head about the nozzle defined by the collar is not contacted by the heating or cooling fluid in the jacket. Consequently, the differential temperature between this area and the area which is contacted by the fluid in the jacket produces thermal stresses which may cause glass failure in the vessel adjacent the nozzle.

In another construction, the jacket is welded directly to the nozzle flange. This reduces thermal stresses by allowing the fluid in the jacket to contact the entire bottom head of the vessel about the nozzle. However, in this case the internal jacket pressure is concentrated over a relatively small area resulting in relatively large force which may reach some 20 tons. The stresses produced by this force in turn may cause glass failure in the nozzle area.

While such nozzles are generally sound and reliable, an unusual amount of glass failures have been observed at the bottom outlet due to the thermal and pressure stresses as described. For example, it has been found that at least half of all glass failures which render a vessel unusable in a corrosive service occur at or near the bottom outlet nozzle.

U.S. Pat. No. 3,425,582 illustrates a flexible expansion joint between the nozzle and the jacket that allows the heating or cooling media to wet the entire bottom head of the vessel including the outlet nozzle. As described in that patent, this flexible connection allows for relative movement between the jacket and nozzle responsive to temperature and pressure differentials.

While designs similar to that shown in the U.S. Pat. No. 3,425,582 have been technically successful, they have proved to be very costly solutions. Also, such designs may interfere with the operation of the outlet valve for the nozzle.

The nozzle design of the present invention allows the jacket to be attached directly to a portion of the nozzle while greatly reducing the possibility of nozzle failure due to excessive thermal or pressure stresses.

SUMMARY OF THE INVENTION

The present invention is an improved nozzle construction characterized by a removable, annular insert positioned within and extending through an opening in the vessel wall, the insert defining a nozzle for the vessel; the outer surface of the insert and the portion of the vessel wall defining the opening being complimentary. A corrosion resistant gasket is disposed between the insert and the vessel wall and a clamp draws the insert against the gasket to provide a fluid tight joint between the insert and the vessel wall. Both the portion of the vessel wall defining the opening and the outer periphery of the insert which may be exposed to the contents of the vessel are provided with a glass coating.

DESCRIPTION OF THE PREFERRED EMBODIMENTS

Figure 1:
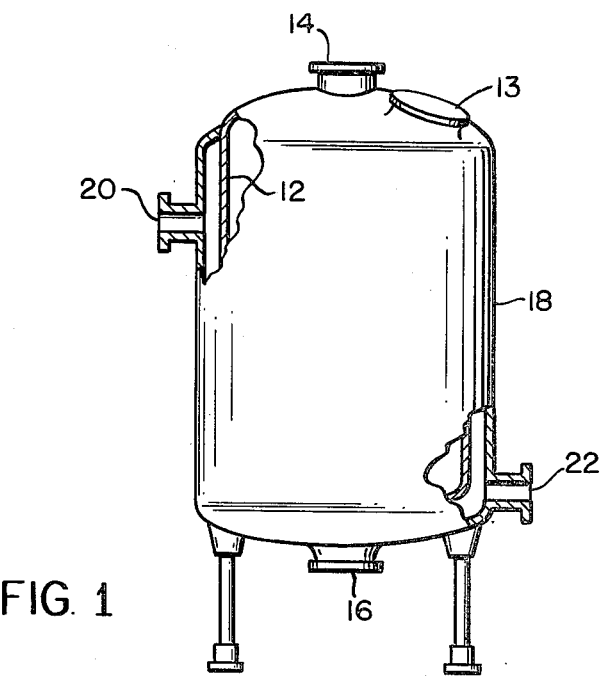
FIG. 1 shows the type of jacketed vessel as may employ the present invention.

Referring to the drawings, FIG. 1 shows a pressure vessel of the type employing the nozzle construction of the present invention. Such vessels are well known in the art as being used to process corrosive or abrasive chemicals, pharmaceuticals, food stuffs and the like. Briefly, such pressure vessel may range in size to several thousands of gallons in which exothermic or endothermic reactions are conducted at several atmospheres of pressure. The vessel consists essentially of a steel wall 12, the entire inner surface of which is provided with a glass or crystalized glass coating. To simplify the description herein, it should be understood that the term "glass" is intended to mean either vitrified or partially crystallized glass.

The vessel is provided with a manhole 13 and one or more top located nozzles 14 for loading the vessel and for inserting various accessories into the vessel such as mixers, baffles, temperature probes and the like as may be necessary to process the materials within the vessel. In addition, there is at least one bottom located outlet nozzle 16 through which the contents of the nozzle may be discharged. Any suitable valve means (not shown) may be used to close both the upper and lower nozzles.

Fixed about the vessel by known means is a jacket 18. An inlet 20 and an outlet 22 provide for the circulation of liquid within the jacket and about the vessel to heat or cool the vessel as may be necessary.

In order to provide proper heating or cooling over the entire bottom head of the vessel, it is important to attach the jacket to, or as close as possible to, the outlet nozzle 16. However, as mentioned hereinabove, prior art nozzle construction has a relatively high incidence of failure due to the thermal and pressure stress between the jacket and nozzle. In the present invention, a nozzle construction is provided which permits direct jacket attachment so as to allow the heating or cooling media to wet the entire bottom head of the vessel including the nozzle, while at the same time practically eliminating damage due to thermal and pressure stresses at the connection. Moreover, the nozzle construction of the present invention is easily replaced should mechanical or impact damage occur, lends itself to installation of a variety of sensor packages and can be easily modified to accommodate special needs of the customer.

Figure 2:
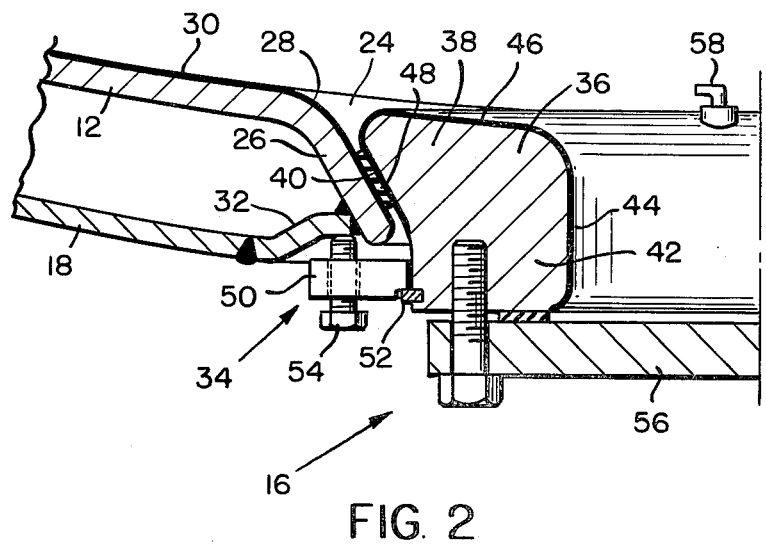
FIG. 2 is a sectional view on an enlarged scale of the bottom outlet nozzle of the vessel employing the present invention.

FIG. 2 shows the construction of one embodiment of a bottom nozzle 16 on an enlarged scale. The opening 24 in vessel wall 12 is formed by a swaging operation as is customary with this type of vessel. Briefly, formation of opening 24 is accomplished by heating wall 12 to the softening point and then forcing a die through the wall. This provides opening 24 with a small frusto-conical flange 26, this flange merging with vessel wall 12 in a smooth radius as indicated at 28. Such a smooth radius is needed in the subsequent glassing operation so as to allow a continuous glass coating 30 to extend over the inner surface of the vessel wall and flange.

As thus far described, the nozzle is similar to prior art construction except that in the present invention, opening 24 is substantially larger in diameter than conventional nozzle openings. For example, where a conventional nozzle opening might be on the order of four inches in diameter, the diameter of opening 24 would be closer to twelve inches. This relatively large diameter of opening 24 acts to distribute the forces produced by pressure within the jacket over a relatively large area so that pressure stresses created between the jacket and nozzle are relatively low. For this reason, the jacket 18 can be attached directly to flange 26. This is accomplished by first welding a jacket collar 32 to the flange and then welding the bottom head of jacket 18 to this collar.

With the jacket being attached directly to flange 26, it should be appreciated that the cooling or heating media circulating within the jacket and about vessel wall 12 is able to contact the entire bottom head surface of the vessel about the nozzle opening 24. This produced several desirable results. For example, having the entire bottom head of the vessel exposed to the fluid in the jacket eliminates any differential temperatures as mentioned above so as to reduce or eliminate thermal stresses.

Fixed witin nozzle opening 24 is a removable nozzle 36. The nozzle is generally annular in shape. A first portion 38 of the nozzle has a generally frusto-conical outer surface 40 which is complimentary to the interior surface of flange 26.

A second portion 42 of the nozzle extends through the passage defined by flange 26 and carries a means for attaching the nozzle to the vessel as set out hereinbelow. The passage 44 defined by the nozzle 36 is the outlet passage of bottom nozzle 16.

Preferably, the entire outer surface of nozzle 36 as may be exposed to the contents within the vessel is provided with a corrosion and abrasion resistant glass coating 46. For this purpose, each edge of the nozzle has a generous radius so as to except the glass coating.

Between the inner surface of flange 26 and the outer surface of portion 38 is a gasket 48. Gaskets able to withstand the corrosive or abrasive materials within the vessel are well known in the art.

Nozzle 26 is pulled down tightly against gasket 48 by an appropriate clamp means indicated at 34. This clamp is relatively conventional in design and comprises an annular member 50 which is held to the insert by a split ring 52. Bolts 54 which are threaded through member 50 and bear against jacket collar 32 are simply tightened to draw the nozzle 36 against seal 48 and flange 26.

Considerable force must be used to insure that the nozzle is properly seated against gasket 48. Jacket collar 32 acts as a reinforcing ring which strengthens flange 26 so it is better able to bear the seating force.

A plate 56 which is bolted to the nozzle is shown only to illustrate how the flange of a valve (not shown) may be attached to the nozzle.

The nozzle construction as described has several advantages, for example, it is easier to construct than either a conventional nozzle design or a design as shown in U.S. Pat. No. 3,425,582. The design allows circulation of the cooling or heating media around substantially the entire bottom surface area of the vessel. The relatively large swaged opening 24 as compared to conventional nozzle designs provides a relatively large area over which the separating forces due to jacket pressure or temperature differentials may be distributed thereby greatly reducing stresses in the area of the nozzle. The gasket 48 interposed between the nozzle and flange not only seals but also provides a means for accommodating any differentials in the thermal expansion or contraction between flange 26 and the nozzle. This design further simplifies construction in one aspect in that opening 24 can be made a standard size, such as a twelve inch diameter, while nozzles 36 are made with different diameter passages 44 so as to accommodate valves of various sizes such as one having a three, four, five or six inch diameter bore.

It should also be apparent that if the nozzle 36 is damaged during the use, it can be replaced in the field quickly and easily. This avoids the necessity of prior art construction which required that the vessel be shipped back to the factory for repair and reglassing should the nozzle fail.

A further advantage of the present invention is that due to the relatively massive size of nozzle 36, it is a convenient place to locate instrumentation a temperature sensor 58 or other appropriate sensor such as a pH sensor or an electrical probe which detects the appearance of faults in the glass coating of the vessel. A temperature sensor in this area is particularly useful as it is located in a high turbulence area. Also, it is relatively well insulated from the jacket by gasket 48 so that its indication of the temperature of the vessel contents is not substantially affected by the temperature of the heating or cooling medium in the jacket. The leads from such a sensor extends axially through an appropriate bore (not shown) in the insert for attachment to recording or read out device (not shown) outside of the vessel.

Figure 3:
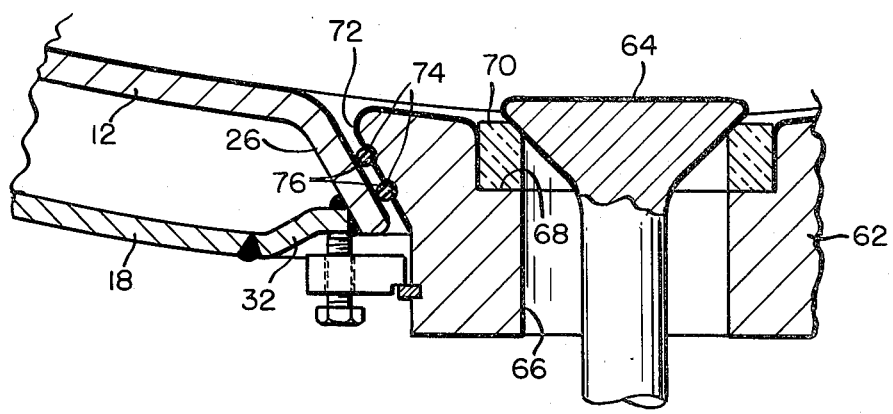
FIGS. 3 to 5 are views similar to FIG. 2 only showing other embodiments of the invention.

FIG. 3 illustrates another embodiment wherein the nozzle 62 incorporates a valve seat for a valve member 64. In this respect, the opening 66 through the nozzle is counterbored at 68. Pressed and sealed within the counterbore is a valve seat 70 which can be made of any of the materials commonly used in corrosive or abrasive environment such as a glass filled PTFE, a tantalum coated steel ring, ceramic, hastelloy or the like. This valve seat can be locked into position by interference fit or could be fused into position or fastened to the insert by other means known in the art.

Also illustrated in FIG. 3 is another form of a gasket between nozzle 62 and the vessel flange 26. In this respect, FIG. 3 shows that the surface 72 of the insert complimentary to vessel flange 26 is provided with at least two peripheral grooves 74. These grooves provide seats for conventional O-rings 76.

Figure 4:
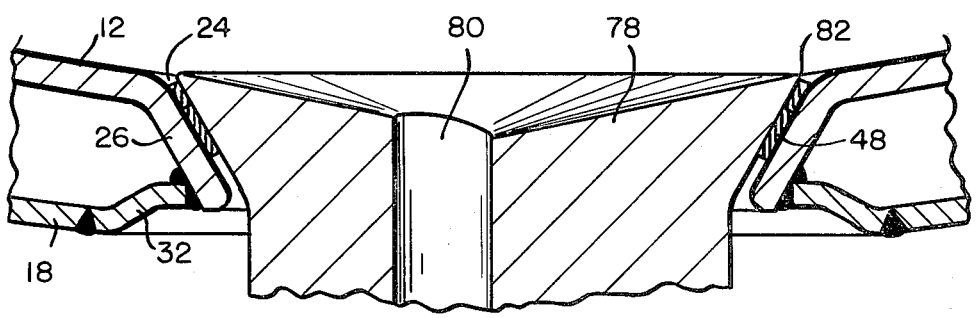

FIG. 4 illustrates an embodiment wherein the nozzle 78 has an opening 80 which is off center. This is to illustrate how the present invention allows custom designing of nozzle openings and configuration to the special needs of the customer. In addition, FIG. 4 illustrates that the nozzle can be made from a corrosion resistant material such as Hastelloy or inconel, so that it need not be glass coated. For this reason, the edges of the nozzle identified at 82 can be relatively sharp thereby eliminating any pocket and allowing for more complete drainage of the contents of the vessel.

Figure 5:
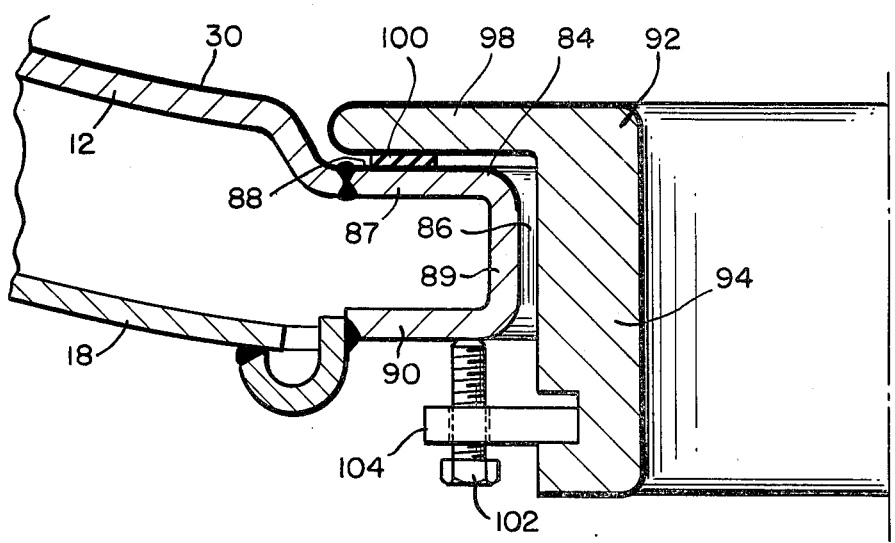

In the embodiment shown in FIG. 5, the swaged vessel opening and its generally conical flange has been replaced by a different construction. In this respect, an opening is cut in the wall of vessel 12 and a cast profile ring 84 then welded in place. This profile ring defines the vessel opening 86 corresponding to vessel opening 24 of FIGS. 2-4 and replaces the conical flange 26 formed by swaging.

The profile ring 84, being a cast or forged article, can be held to more critical tolerances than a swaged opening and less distortion is created when welding the profile ring to the jacket.

The profile ring 84 is generally U-shaped in cross section. One leg 87 formed by an annular part, is welded to the vesssel wall and forms a seat 88 in the bottom of the vessel for purposes set out hereinbelow. The base 89 of the U-shape formed by a cylindrical section defines the vessel opening 86. The second leg 90 formed by a second annular part is welded to jacket 18. The glass coating 30 lining vessel wall 12 is continuous and extends over the leg 87 of the profile ring so that seat 88 is glass lined, this glass lining being fired on the vessel wall and profile ring after the profile ring has been welded to vessel wall 12.

Nozzle 92 in this embodiment includes a generally cylindrical piece 94 having an outside diameter slightly less than the inside diameter of vessel opening 86, the cylindrical piece extending through vessel opening 86. A flange 98 formed integral the cylindrical piece is complementary to, and fits into seat 88. A gasket 100 is disposed between the complementary surfaces of seat 88 and flange 98 and is compressed between these surfaces by the clamping action of bolts 102 (only one being shown) acting between a split ring 104 and the leg 90 of the profile ring.

Figure 6:
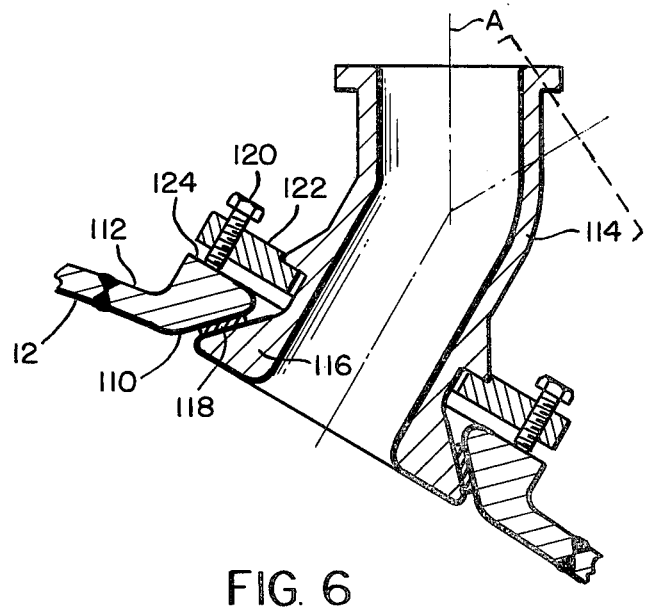
FIG. 6 shows the invention as may be used in a nozzle for the top head of the vessel.

Still another embodiment is illustrated in FIG. 6. Here the invention is adapted for use as a nozzle in the top head of the vessel which again illustrates the versatility of the nozzle construction according to the present invention.

In FIG. 6 a vessel opening can be formed by a sewage normal to the head in order to provide a frusto-conical flange as shown in FIGS. 2-4. As an alternative, an opening can simply be cut in the top head of the vessel wall 12 and a separate nozzle profile ring 112 welded in place. A nozzle 114, extending through the vessel opening defined by profile ring 112, has an end portion 116 which is complementary to the surface 110 defining the vessel opening. As in the other embodiments, a gasket 118 disposed between the complementary surfaces of members 112 and 116 is compressed between these members by the action of bolts 120 acting between split ring 122 and a bearing surface 124 on ring 112.

The nozzle 114 in this embodiment has an elbow bend. On installation it can be set at any desired position simply by rotating the nozzle prior to clamping it in place with bolts 120. Thus, the nozzle can be set as shown in full line in FIG. 6 or rotated about its axis A until the elbow bend is in the position shown in dashed lines in FIG. 6.

Thus, with relatively few standard parts a top located nozzle can be located in a number of positions to suit the special needs of the customer. This separate nozzle also facilitates the glass lining operation as the nozzle can now be fired separately from the vessel itself.

Thus, it should be appreciated that the nozzle construction of the present invention provides several desirable advantages over nozzle construction of the prior art. The invention allows relatively easy custom designing of nozzle openings relative to size and the position of the nozzle opening. The nozzle opening can be on center or off center with respect to the swaged opening receiving the nozzle. Another important advantage is that in the prior art the nozzle was integral the vessel and had to be fired to fuse the glass lining over the nozzle at the same time that the vessel was fired. In the present invention, however, the nozzle can be fired separately from the vessel so that nozzle design is not dictated by the firing requirements of the vessel. A further advantage is that now nozzles of a standard design can be mass produced at one location and shipped to another location for application to vessels. Along with this feature is the ability to quickly remove and replace a defective or damaged nozzle in the field whereas in the prior art, the vessel had to be returned to the factory for removal of the nozzle and reglassing. All of the above advantages are of course in addition to the primary concern, namely, the reduction if not elimination of nozzle failures due to thermal or mechanical stresses.

Having thus described the invention in detail, what is claimed as new is:

1. A replaceable nozzle for an opening in the wall of a pressure vessel having an outer jacket wall spaced from an outer glass lined metal wall of the vessel for containing a heating or cooling liquid therebetween said walls comprising:
    (a) a glass coated flange extending outward from said vessel wall about said opening and connected to said jacket wall, said flange defining a passageway through said jacket;
    (b) a removable nozzle inserted in and extending through said passageway and provided with an outer glass coated surface, a first portion of said nozzle extending outward from said passageway and a second peripheral portion of said nozzle being disposed within said passageway, said second portion having an outer surface complementary to an interior surface of said flange;
    (c) a gasket between said complementary flange and said second peripheral nozzle glass coated surfaces to compensate for thermal and pressure stresses between said glass coated flange and nozzle surfaces caused by the liquid in said pressure vessel; and
    (d) clamp means cooperating with said jacket and first nozzle portion for fixing said nozzle in fluid tight relationship within said passageway and against said gasket.

2. A replaceable nozzle as in claim 1 wherein said flange is an integral part of said vessel formed by swaging through the vessel wall, said flange being tapered to define a frusto-conical passageway, the larger diameter of said passageway opening into said vessel.

3. A replaceable nozzle as in claim 1 wherein:
 (a) said flange includes:
  (i) a first annular part fixed about its periphery to said vessel wall and forming a seat within said vessel;
  (ii) a second annular part axially spaced from the first and fixed about its periphery to said jacket to form an extension thereof and
  (iii) a cylindrical intermediate section extending between and fixed at its ends to said first and second annular parts, said intermediate section defining said passageway; and
 (b) said nozzle including a cylindrical body extending through said passageway, said second nozzle portion being at one end of said body and extending radially outward therefrom for reception into said seat.

4. A replaceable nozzle as in claim 2 or 3 wherein the through opening of said nozzle is offset from the axis of said nozzle.

5. A replaceable nozzle as in claims 2 or 3 wherein the through opening of said nozzle in counterbored at said nozzle second portion and a valve seat is fixed in said counterbore.

6. A replaceable nozzle as in claims 2 or 3 wherein the surfaces of said flange and nozzle as may be exposed to the contents of said vessel are provided with a glass coating.

7. A replaceable nozzle as in claims 2 or 3 wherein the outer periphery of said nozzle second portion is provided with at least one circumferential groove, said gasket being retained in said groove.

8. A replaceable nozzle as in claims 2 or 3 wherein said clamp means comprises:
 (a) a split ring engaging about said nozzle first portion; and
 (b) a plurality of bolts threaded through said split ring and engaging against said jacket.

9. A replaceable nozzle as in claims 2 or 3 including instrumentation mouned on said nozzle second portion.

10. A replaceable nozzle as in claims 2 or 3 wherein said first nozzle portion has an elbow bend.

11. In a pressure vessel having an outer jacket wall spaced from an inner corrosion resistant, glass lined metal wall for containing a heating or cooling liquid therebetween and an opening through said wall, an improved nozzle construction for said opening comprising:
 (a) a flange extending outward from said vessel wall about said opening, said flange merging with said vessel wall in a smooth radius and a continuous glass coating extending from said vessel wall over said radius and the internal surface of said flange;
 (b) said vessel jacket wall being rigidly fixed to said flange so that flange defines a passage opening through said jacket and communicating with said vessel opening;
 (c) a nozzle extending through said passage, a portion of the exterior surface of said nozzle being glass coated and complementary of said internal surface of said flange;
 (d) gasket means between said complemenatry glass coated surfaces of said flange and nozzle to compensate for thermal and pressure stresses between said surfaces carried the liquid in said pressure vessel; and
 (e) clamp means acting between said nozzle and jacket for drawing said nozzle against said gasket in fluid tight relationship and fixing said nozzle with said passage.

* * * * *